United States Patent
Motosugi et al.

(10) Patent No.: US 7,382,474 B2
(45) Date of Patent: Jun. 3, 2008

(54) PRINTER MANAGEMENT METHOD AND MANAGEMENT SYSTEM

(75) Inventors: Toshihisa Motosugi, Okazaki (JP); Akio Nakajima, Toyokawa (JP); Kazuyuki Kawabata, Toyokawa (JP); Kenichi Matsumoto, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 731 days.

(21) Appl. No.: 10/234,478

(22) Filed: Sep. 5, 2002

(65) Prior Publication Data

US 2003/0053112 A1    Mar. 20, 2003

(30) Foreign Application Priority Data

Sep. 5, 2001    (JP) ............................. 2001-269121

(51) Int. Cl.
 G06K 15/00    (2006.01)
 G06F 3/12    (2006.01)
(52) U.S. Cl. .................... 358/1.14; 358/1.13; 358/1.15
(58) Field of Classification Search ............. 358/1.13, 358/1.14, 1.15, 1.1, 437; 399/69, 70, 1, 8, 399/9; 347/2, 3, 5
 See application file for complete search history.

(56) References Cited

U.S. PATENT DOCUMENTS 5,915,148 A * 6/1999 Hamaguchi et al. .......... 399/77
6,029,238 A * 2/2000 Furukawa ....................... 712/1
6,094,546 A * 7/2000 Nakazato et al. ............. 399/1
6,822,754 B1 * 11/2004 Shiohara ................... 358/1.15
2002/0054316 A1 * 5/2002 Abe ......................... 358/1.14

FOREIGN PATENT DOCUMENTS

| JP | 05-284263 |  | 10/1993 |
| JP | 06-247013 | A | 9/1994 |
| JP | 08-234937 | A | 9/1996 |
| JP | 11-15606 | A | 1/1999 |
| JP | 11-212743 |  | 8/1999 |
| JP | 11-212743 | A | 8/1999 |

* cited by examiner

Primary Examiner—Dov Popovici
(74) Attorney, Agent, or Firm—Buchanan Ingersoll & Rooney PC

(57) ABSTRACT

There is provided a printer management method in a computer system of the present invention, which controls a plurality of printers connected to a network, including acquiring information related to an elapsed time from the time when each printer made a transition to the power save mode, and selecting a printer based on the acquired information related to the elapsed time. According to the present invention, a printer can be appropriately selected even when printers are waiting in the power save mode.

16 Claims, 8 Drawing Sheets

Fig.9

| TIME FROM START OF SLEEP (S) | FIXING ROLLER TEMPERATURE (°C) |
|---|---|
| 0 | 170 |
| 1 | 169.5 |
| 2 | 169 |
| : | : |
| : | : |
| 60 | 135 |
| 61 | 134 |
| 62 | 132.8 |
| : | : |
| : | : |

Fig.10

| FIXING ROLLER TEMPERATURE (°C) | RECOVERY TIME TO STANDBY MODE (S) |
|---|---|
| 170 | 0 |
| 169 | 0.5 |
| 168 | 1 |
| : | : |
| : | : |
| 135 | 60 |
| 134 | 61 |
| 133 | 62.2 |
| : | : |
| : | : |

PRINTER MANAGEMENT METHOD AND MANAGEMENT SYSTEM

This application is based on application No. 2001-269121 filed in Japan, the contents of which is hereby incorporated by reference.

BACKGROUND OF THE INVENTION

The present invention relates to a printer management method in a computer system, which controls a plurality of printers connected to a network.

Furthermore, the present invention relates to a printer management system, which controls a plurality of printers connected to a network.

In an environment where a client computer and a plurality of printers are connected in a network such as a LAN (Local Area Network) or the like, there is a requirement from a client that a print job should be sent to a printer that can execute and complete the print job in the shortest time among the plurality of printers. In order to respond to such a requirement, a technique wherein a status (state) of each printer is acquired and a printer that completes printing in the shortest time is selected based on the status is described in Japanese Patent Laid-open Publication No. 5-284263. Furthermore, a technique wherein a warm-up time of each printer is acquired or, when the warm-up time cannot be acquired, temperature information of a fixing heater is acquired to calculate the warm-up time from the temperature information, and a printer with the shortest warm-up time is selected is described in Japanese Patent Laid-open Publication No. 11-212743.

Generally, for the purpose of power saving in a printer, when a predetermined time elapses after completion of printing, power is supplied only to a controller that executes a network interface program, and power supply to the other controllers is interrupted, which is called a power save mode. Therefore, in a LAN of general users, printers are not constantly operated, but they are waiting in the power save mode most of the time. Since power is usually supplied only to the controller that executes a network interface program, a status of these printers waiting in the power save mode that the printers are in the power save mode can be acquired, but detail situations of the printers such as temperature of their fixing heaters and the like cannot be acquired. Therefore, an appropriate printer cannot be selected from the printers waiting in the usual power save mode with the techniques described in the aforementioned publications.

An object of the present invention is to provide a printer management system and method, with which a printer can be appropriately selected even when printers are waiting in the power save mode.

Another object of the present invention is to provide a printer management system and method, with which printing can be started or completed in the shortest time even when printers are waiting in the power save mode.

SUMMARY OF THE INVENTION

In order to achieve the object, a printer management method in a computer system of the present invention, which controls a plurality of printers connected to a network, comprises the steps of:

acquiring information related to an elapsed time from the time when each printer made a transition to the power save mode; and selecting a printer based on the acquired information related to the elapsed time.

According to the printer management method of the present invention, a printer can be appropriately selected even when printers are waiting in the power save mode.

In an embodiment of the printer management method, the information related to the elapsed time is information about temperature of a fixing roller in the printer.

In an embodiment of the printer management method, the information related to the elapsed time is information related to a recovery time from the current power save mode to standby mode, in which printing can be performed.

According to this embodiment of the printer management method, printing can be started in the shortest time even when printers are waiting in the power save mode.

In an embodiment of the printer management method, a step of acquiring information about a time required for printing processing is further included, and, in the step of selecting a printer, the information about the time required for printing processing is also added to select a printer.

According to this embodiment of the printer management method, printing can be completed in the shortest time even when printers are waiting in the power save mode.

In an embodiment of the printer management method, this method is executed when all the controlled printers are in the power save mode when a print job occurs.

In an embodiment of the printer management method, in the step of selecting a printer, a printer that is expected to complete printing earliest among the plurality of printers is selected based on the information about the elapsed time.

According to this embodiment of the printer management method, printing can be completed in the shortest time even when printers are waiting in the power save mode.

In an embodiment of the printer management method, this method is executed by a printer server.

In an embodiment of the printer management method, the power save mode is a sleep mode.

A printer management system of the present invention, which controls a plurality of printers connected to a network, comprises:

a means for acquiring information related to an elapsed time from the time when each printer made a transition to a power save mode; and a means for selecting a printer based on the acquired information related to the elapsed time.

According to the printer management system of the present invention, a printer can be appropriately selected even when printers are waiting in the power save mode.

In an embodiment of the printer management system, the information related to the elapsed time is information about temperature of a fixing roller in the printer.

In an embodiment of the printer management system, the information related to the elapsed time is information related to a recovery time from the current power save mode to a standby mode, in which printing can be performed.

According to this embodiment of the printer management system, printing can be started in the shortest time even when printers are waiting in the power save mode.

In an embodiment of the printer management system, a means for acquiring information about a time required for printing processing is further included, and, the means for selecting a printer selects a printer also based on the information about the time required for printing processing.

According to this embodiment of the printer management system, printing can be completed in the shortest time even when printers are waiting in the power save mode.

In an embodiment of the printer management system, the each means operates when all the controlled printers are in the power save mode when a print job occurs.

In an embodiment of the printer management system, the means for selecting a printer selects a printer that is expected to complete printing earliest among the plurality of printers based on the information about the elapsed time.

According to this embodiment of the printer management system, printing can be completed in the shortest time even when printers are waiting in the power save mode.

In an embodiment of the printer management system, the each means is included in a printer server.

In an embodiment of the printer management system, the power save mode is a sleep mode.

A printer management method in a computer system of the present invention, which controls a plurality of printers connected to a network, comprises the steps of:

storing predetermined information at the time when each printer made a transition to a predetermined mode; and selecting a printer based on the stored information.

According to the printer management method of the present invention, a printer can be appropriately selected even when printers are waiting in the power save mode.

In an embodiment of the printer management method, in the step of storing information, the stored information is successively updated after the time when the printer made a transition to the predetermined mode.

In another aspect, the present invention relates to a program for a network system including printers, more specifically, a program for allowing a computer or a printer to calculate a print completion time. The program of the present invention, which is executed by a computer or a printer for a network system where a computer and a plurality of printer are connected via a network, comprises the steps of:

for each of the printers, judging whether a status of the printer is a power save mode or a standby mode, when the status of the printer is the power save mode, calculating an elapsed time from the time when the printer made a transition from the standby mode to the power save mode, calculating a recovery time required for the status of the printer to recover from the power save mode to the standby mode based on the elapsed time, calculating or acquiring a print processing time required for image data processing and printing on paper for a print job, calculating a print completion time for the print job based on the recovery time and the print processing time, and selecting a printer with the earliest calculated print completion time among the plurality of printers as a destination of the print job.

Here, the term "computer" extensively refers to, for example, a personal computer in which a printer driver is installed or the one such as a server or the like in which a utility program for selecting a printer and instructing a print job is installed. A portable terminal, scanner, facsimile and the like, for example, which instruct a print job to a printer via another computer or directly, are also included.

The term "printer" refers to a device for forming an image in response to a received print job. Therefore, this printer includes a copier having a communication function, for example. It is noted that the device for forming an image includes not only an image forming device by an electrophotographic method, but also an ink jet printer, thermal transfer printer, sublimation type printer and so forth.

The term "standby mode" refers to a status (state) set by the printer, in which, when generation of print image data is completed, a print image can be immediately printed on paper. In this standby mode, power is supplied to controllers such as a printer controller, an engine controller and the like, driving loads such as a fixing heater and the like and sensing devices such as a temperature sensor and the like.

The term "power save mode" refers to a sleep mode or a preheat mode described below.

The term "preheat mode" refers to a status set instead of the standby mode when the printer maintains the standby mode for a predetermined time. In this mode, for the purpose of power saving, power is supplied to controllers such as a printer controller, an engine controller and the like, while the power supply to driving loads such as a fixing heater and the like is interrupted or reduced.

The "sleep mode" is a status set instead of the standby mode when the printer maintains the standby mode for a predetermined time. In this mode, for the purpose of power saving, the power supply to elements other than the network interface is interrupted. In the sleep mode, the power supply is interrupted to any of controllers other than the network interface such as a printer controller, an engine controller and the like, driving loads such as a fixing heater and the like, sensing devices such as a temperature sensor and the like. It is noted that the printer may make a transition to the sleep mode via the preheat mode when making a transition from the standby mode to the sleep mode.

The terms "computer", "power save mode", "standby mode" and so forth have the same definitions throughout the present specification.

According to the program of the present invention, the following processing is executed for each printer connected to the network. First, whether the status of the printer is the power save mode or the standby mode is judged. Then, when the status of the printer is the power save mode, an elapsed time from the time when the printer made a transition from the standby mode to the power save mode is calculated. Then, based on the elapsed time, a recovery time required for the status of the printer to recover from the power save mode to the standby mode is calculated. Meanwhile, a print processing time required for image data processing and printing on paper for a print job is calculated or acquired. Then, based on the recovery time and the print processing time, a print completion time for the print job is calculated. Then, among a plurality of printers connected to the network, a printer with the earliest calculated print completion time is selected as a destination of the print job.

Thus, according to the program of the present invention, whether the printer is in the power save mode is judged, a recovery time required to recover to the standby mode is calculated based on an elapsed time from the time when the printer made a transition from the standby mode to the power save mode, and, based on this time, a printer with the earliest print completion time is selected. Therefore, even if printers that are waiting in the power save mode exist in the network system, a printer with the earliest print completion time can be correctly selected as the destination of the print job.

In general, since image data processing in the printer and printing on paper are performed with an overlapped time, a total print processing time is obtained taking account of this overlapped time. Here, it is desirable that the print processing time is obtained by dividing it into "time when image data processing is performed before the start of printing on paper (referred to as "pretreatment time")" and "time when printing is actually being performed after the start of printing on paper (referred to as "real print time")". In this case, after a longer (slower) time of the recovery time or the pretreatment time elapses, printing on paper is started. This is reflected on the calculation of the print completion time. That is, when the recovery time is longer than the pretreatment time, the print completion time is calculated based on the sum of the recovery time and the real print time. On the other hand, when the pretreatment time is longer the recovery time, the print completion time is calculated based on the sum of the pretreatment time and the real print time.

In another aspect, a program of the present invention, which is executed by a computer or printer for a network system where a computer and printers are connected via a network, comprises the steps of:

judging whether a status of the printer is a power save mode or a standby mode, when the status of the printer is the power save mode, calculating an elapsed time from the time when the printer made a transition from the standby mode to the power save mode, calculating a recovery time required for the status of the printer to recover from the power save mode to the standby mode based on the elapsed time, calculating or acquiring a print processing time required for image data processing and printing on paper for a print job, calculating a print completion time for the print job based on the recovery time and the print processing time, and notifying the calculated print completion time to a computer to which a send request for the print job is inputted.

According to this program, the following processing is executed for each printer connected to the network. First, whether the status of the printer is the power save mode or the standby mode is judged. Then, when the status of the printer is the power save mode, an elapsed time from the time when the printer made a transition from the standby mode to the power save mode is calculated. Then, based on the elapsed time, a recovery time required for the status of the printer to recover from the power save mode to the standby mode is calculated. Meanwhile, a print processing time required for image data processing and printing on paper for a print job is calculated or acquired. Then, based on the recovery time and the print processing time, a print completion time for the print job is calculated. Then, the calculated print completion time is notified to a computer to which a send request for the print job is inputted.

Thus, according to this program, whether the printer is in the power save mode is judged, a recovery time required to recover to the standby mode is calculated based on an elapsed time from the time when the printer made a transition from the standby mode to the power save mode, and, based on this time, a print completion time is calculated or acquired. Therefore, a correct print completion time can be notified to a computer to which a send request for the print job is inputted, that is, a correct client.

In another aspect, the present invention relates to a management method for allowing a computer or a printer to calculate a print completion time for the network system including printers. The management method of the present invention, which is used by a computer or a printer for a network system where a computer and a plurality of printers are connected via a network, includes the steps of:

for each of the printers, judging whether a status of the printer is a power save mode or a standby mode, when the status of the printer is the power save mode, calculating an elapsed time from the time when the printer made a transition from the standby mode to the power save mode, calculating a recovery time required for the status of the printer to recover from the power save mode to the standby mode based on the elapsed time, calculating or acquiring a print processing time required for image data processing and printing on paper for a print job, calculating a print completion time for the print job based on the recovery time and the print processing time, and selecting a printer with the earliest calculated print completion time among the plurality of printers as a destination of the print job.

This management method has the same action effect as in the case where the aforementioned program is executed. That is, according to this management method, whether the status of the printer is the power save mode is judged. Then, a recovery time required for the status of the printer to recover to the standby mode is calculated based on an elapsed time from the time when the printer made a transition from the standby mode to the power save mode. Then, based on this time, a printer with the earliest calculated print completion time is selected as a destination of the print job. Therefore, even if printers that are waiting in the power save mode exist in the network system, a printer with the earliest print completion time can be correctly selected as the destination of the print job.

In another aspect, the present invention relates to a management method used by a computer or printer for a network system where a computer and a plurality of printers are connected via a network, which includes execution of the steps of:

judging whether a status of the printer is a power save mode or a standby mode, when the status of the printer is the power save mode, calculating an elapsed time from the time when the printer made a transition from the standby mode to the power save mode, calculating a recovery time required for the status of the printer to recover from the power save mode to the standby mode based on the elapsed time, calculating or acquiring a print processing time required for image data processing and printing on paper for a print job, calculating a print completion time for the print job based on the recovery time and the print processing time, and notifying the calculated print completion time to a computer to which a send request for the print job is inputted.

This management method has the same action effect as in the case where the aforementioned program is executed. That is, according to this management method, whether the printer is in the power save mode is judged, a recovery time required to recover to the standby mode is calculated based on an elapsed time from the time when the printer made a transition from the standby mode to the power save mode, and, based on this time, a print completion time is calculated or acquired. Therefore, a correct print completion time can be notified to a computer to which a send request for the print job is inputted, that is, a correct client.

In another aspect, the present invention relates to a management system for allowing a computer or a printer to calculate a print completion time for the network system including printers. The management system of the present invention for a network system where a computer and a plurality of printers are connected via a network, includes:
for each of the printers,
a means for judging whether a status of the printer is a power save mode or a standby mode,
a means for, when the status of the printer is the power save mode, calculating an elapsed time from the time when the printer made a transition from the standby mode to the power save mode,
a means for calculating a recovery time required for the status of the printer to recover from the power save mode to the standby mode based on the elapsed time,
a means for calculating or acquiring a print processing time required for image data processing and printing on paper for a print job,
a means for calculating a print completion time for the print job based on the recovery time and the print processing time, and
a means for selecting a printer with the earliest calculated print completion time among the plurality of printers as a destination of the print job.

When this management system is operated, the same action effect is demonstrated as in the case where the aforementioned program is executed. That is, this management system according to an aspect of the invention judges whether the status of the printer is the power save mode, calculates a recovery time required for the status of the printer to recover to the standby mode based on an elapsed time from the time when the printer made a transition from the standby mode to the power save mode and, based on this time, selects a printer with the earliest calculated print completion time. Therefore, even if printers that are waiting in the power save mode exist in the network system, a printer with the earliest print completion time can be correctly selected as the destination of the print job.

In another aspect, the present invention relates to a management system for a network system where a computer and a plurality of printers are connected via a network, which includes:
a means for judging whether a status of the printer is a power save mode or a standby mode,
a means for, when the status of the printer is the power save mode, calculating an elapsed time from the time when the printer made a transition from the standby mode to the power save mode,
a means for calculating a recovery time required for the status of the printer to recover from the power save mode to the standby mode based on the elapsed time,
a means for calculating or acquiring a print processing time required for image data processing and printing on paper for a print job,
a means for calculating a print completion time for the print job based on the recovery time and the print processing time, and
a means for notifying the calculated print completion time to a computer to which a send request for the print job is inputted.

When this management system is operated, the same action effect is demonstrated as in the case where the aforementioned program is executed. That is, this management system according to another aspect of the invention judges whether the status of the printer is the power save mode, calculates a recovery time required for the status of the printer to recover to the standby mode based on an elapsed time from the time when the printer made a transition from the standby mode to the power save mode and, based on this time, calculates or acquires a print completion time. Therefore, a correct print completion time can be notified to a computer to which a send request for the print job is inputted, that is, a client.

BRIEF DESCRIPTION OF THE DRAWINGS

FIG. 9 is an example table showing correspondence between an elapsed time from the time when the printer 1-x made a transition to the sleep mode and the fixing roller temperature depending on the elapsed time;
and
FIG. 10 is a table showing correspondence between fixing roller temperature in the sleep mode and a recovery time required for the printer 1-x to reach the standby mode from the time when the printer starts up in a state with the fixing roller temperature.

DETAILED DESCRIPTION OF THE PREFERRED EMBODIMENTS

Hereafter, embodiments of the present invention are described in detail with reference to accompanying drawings.

Figure 1:
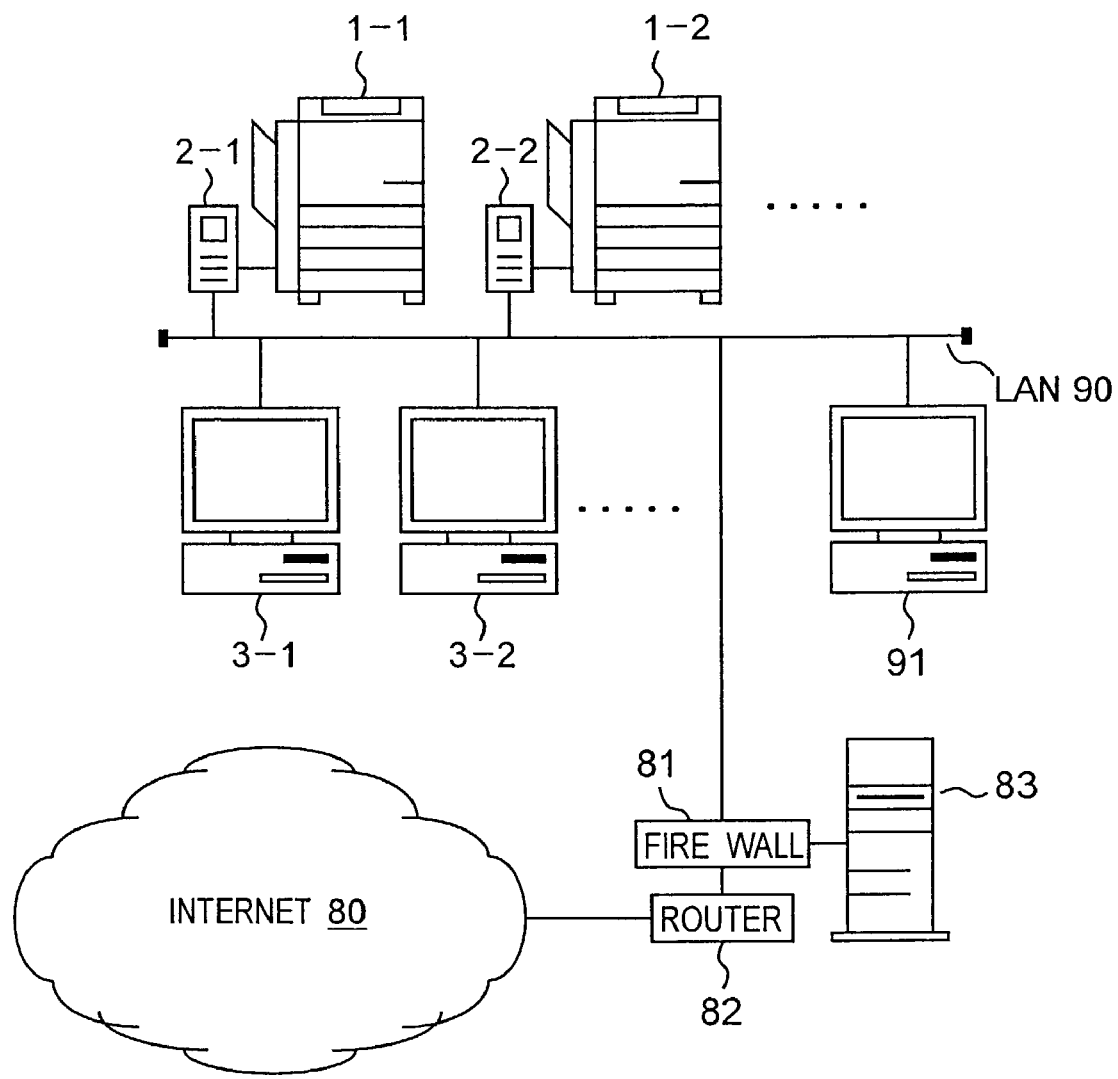
FIG. 1 shows a schematic configuration of a LAN including printers, to which the present invention is applied.

FIG. 1 shows a schematic configuration of a LAN (Local Area Network) 90 of a user company, to which the present invention is applied.

To this LAN 90, connected are printers 1-1, 1-2, . . . (hereinafter, referred to as "1-x") via printer controllers 2-1, 2-2, . . . (hereinafter, referred to as "2-x"), respectively, as well as client systems 3-1, 3-2, . . . (hereinafter, referred to as "3-y") and a printer server 91 for controlling the printers 1-x and the printer controllers 2-x.

The LAN 90 is connected to Internet 80 via a fire wall 81 and a router 82. The fire wall 81 has functions such as packet filtering, proxy and so forth and permits passage of only packets of which sender IP address (host name), destination IP address (host name), sender port number, destination port number and data satisfy predetermined conditions. Therefore, only predetermined packets can be sent from Internet 80 to the printer controllers 2-x in the LAN 90. In this embodiment, communication by SMTP (Simple Mail Transfer Protocol) can be passed through the fire wall. The router 82 executes path control. It is noted that the LAN may have not only wired connection but also wireless connection as used in infrared communication, Bluetooth communication or the like.

Furthermore, a mail server 83, which performs a service of collection and distribution of electronic mail, is connected to the LAN 90. The printer controller 2-x downloads an electronic mail having attachment of image information from the mail server 83. The image information (image data) fetched from the electronic mail is passed on to the printer 1-x and printed.

Figure 2:
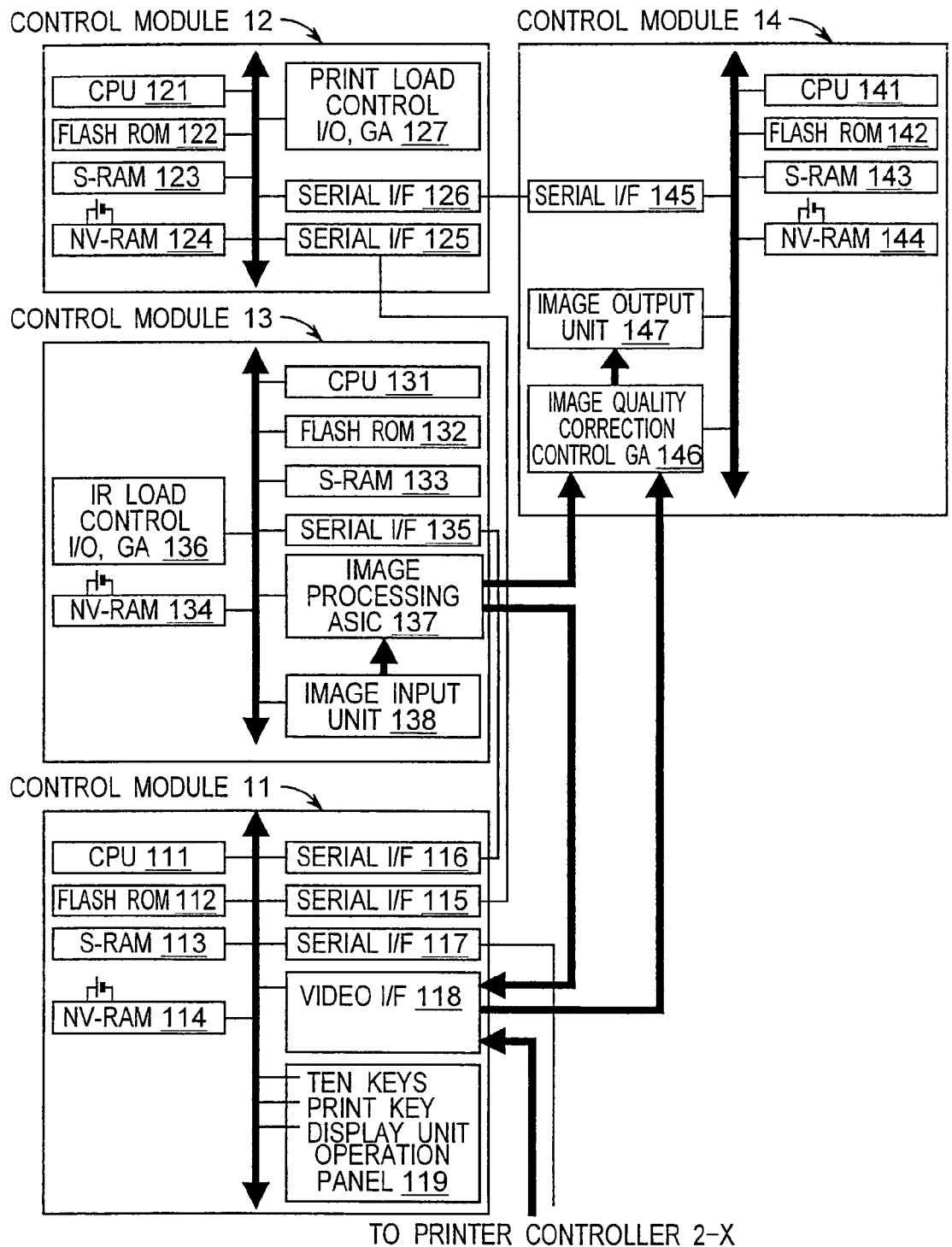
FIG. 2 is a block diagram showing a printer 1-x connected to the LAN.

FIG. 2 is a block diagram showing the printer (image forming device) 1-x.

This printer 1-x is generally called MFP (Multiple Function Peripheral) and has a function of scanning a script image and printing the copied image on paper (hereinafter, referred to as a copy job), a function of printing an image received from the client system 3-y or an image received by an electronic mail via the mail server (hereinafter, referred to as a print job) and a function of scanning a script image and sending the image information by an electronic mail (hereinafter, referred to as an image information sending job).

Furthermore, this printer 1-x is a device controlled by a multi-CPU (Central Processing Unit) and includes four control modules 11-14 (engine controllers) corresponding to each CPU as shown in FIG. 2. It is noted that, in this embodiment, a module refers to a function block that executes a control function including the CPU or control circuits including the CPU.

The control module 11 includes a CPU 111 for sending a control command and control information to the control modules 12-14, which is responsible for the total control of the printers 1-x, rewritable flash ROM (nonvolatile memory) 112, which stores its firmware, S-RAM 113 used as a work area, NV-RAM (nonvolatile memory) 114 backed up with a battery for storing various set values, serial I/F (Interface) 115 for sending and receiving various control data to and from the control module 12, serial I/F 116 for sending and receiving various control data to and from the control module 13, serial I/F 117 for sending and receiving various control data to and from the printer controller 2-x and operation panel 119. Furthermore, this control module 11 has a video I/F 118 for receiving image data of a print job from the printer controller 2-x, receiving image data of a read image from the control module 13 and sending image data of the read image received from the control module 13 to the printer controller 2-x.

The control module 12 includes a CPU 121, which executes print control such as drive control or the like of various driving loads of the printer 1-x, rewritable flash ROM (nonvolatile memory) 122, which stores its firmware, S-RAM 123 used as a work area, NV-RAM 124 backed up with a battery for storing various set values, serial I/F 125 for sending and receiving various control data to and from the control module 11, serial I/F 126 for sending and receiving various control data to and from the control module 14, motor heater switch in the printer 1-x, a print load control I/O (Input/Output), which is a drive control circuit of various driving loads of a fixing roller with a built-in heater or the like, for example, and GA (Gate Array) 127.

The control module 13 includes a CPU 131, which executes reading and scanning control of a script image for the printer 1-x and image processing control, rewritable flash ROM (nonvolatile memory) 132, which stores its firmware, S-RAM 133 used as a work area, image input unit 138, which controls a drive of CCD or the like to input photoelectrically converted image data, image processing ASIC (Application Specific Integrated Circuit) 137, which executes various image processing such as shading compensation, reflectance and concentration conversion, MTF correction, concentration correction, binary coded processing such as error diffusion and so forth for the image data from the image input unit and outputting the processed image data to the control module 14 or the control module 11, NV-RAM 134 backed up with a battery for setting various set values, serial I/F 135 for sending and receiving various control data to and from the control module 11, IR (Image Reader) load control I/O (Input/Output), which is a drive control circuit of various driving loads such as a scanning motor and a scanning lamp of the IR and the like and GA (Gate Array) 136.

The control module 14 includes a CPU 141, which executes image quality correction control and image output control for the printer 1-x, rewritable flash ROM 142, which stores its firmware, S-RAM 143 used as a work area, image quality correction control GA (Gate Array) 146, which executes image quality control such as smoothing, half-tone reproduction processing, image quality correction and so forth, image output unit 147, which outputs an image in response to image data outputted from the image quality correction control GA 146 by controlling a drive of a LD (Laser Diode) or the like, NV-RAM 144 backed up with a battery for setting various set values and serial I/F 145, which sends and receives various control data to and from the control module 12.

Figure 3:
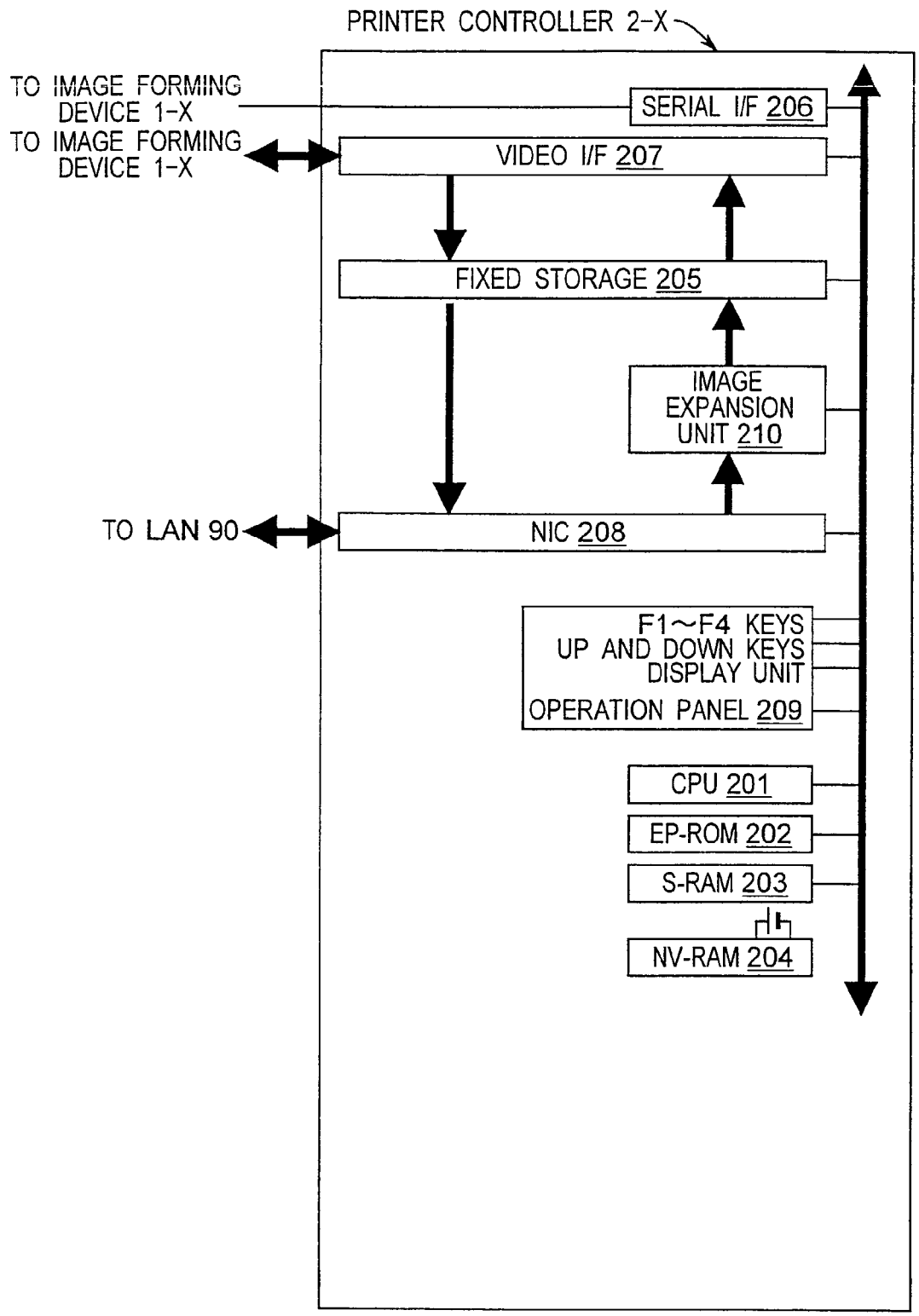
FIG. 3 is a block diagram showing a printer controller 2-x connected to the LAN.

FIG. 3 is a block diagram showing the printer controller 2-x.

This printer controller 2-x includes a CPU 201, EP-ROM (nonvolatile memory) 202, NIC (Network Interface Card) 208, fixed storage (nonvolatile memory) 205 such as a hard disc or the like, image expansion unit 210, S-RAM 203 used as a work area and NV-RAM 204 backed up with a battery for storing various set values and management information.

The aforementioned CPU 201 executes receiving of a print job from a client system 3-y described later, management of a job, management of the firmware, control of image processing of a print image, control of data conversion of image information received by an electronic mail, data conversion of image information sent by the electronic mail and sending and receiving of an electronic mail having attachment of image information and control of rewriting of the firmware. The EP-ROM 202 stores control programs for the CPU 201 to execute processing thereof. The NIC 208 operates to send and receive various data about receiving of a print job from the client system 3-y, sending of image information to other printers and so forth to and from the LAN 90. The fixed storage 205 such as a hard disc or the like stores a print job received from the client system 3-y and an image information sending job. A detail view of the image expansion unit 210 is omitted, but this unit is constituted by an interpreter for converting print data about a received print job described in PDL (Page Description Language) to intermediate codes, font storage unit for storing font information and font data to analyze the intermediate codes, RAM for storing bit map data and drawing processing unit for expanding bit map data expanded from the intermediate codes in RAM.

In addition to the IP address of a printer 1-x (hereinafter, referred to as "self device" as required) controlled by this printer controller 2-x, the NV-RAM 204 stores the IP address of a mail server required when the printer controller 2-x downloads an electronic mail message to the self device 1-x from the mail server 83, names and passwords of electronic mail accounts of the self device 1-x and other printers that are destinations of image information and so forth. Furthermore, a status of the self device 1-x is stored in this NV-RAM 204 by the CPU 201. Examples of the stored status include a busy mode, wherein a print job is being executed, a standby mode, wherein a print image can be printed onto paper immediately after generation of print image data is completed, a sleep mode, wherein the main power supply is interrupted for the purpose of power saving, and a dead mode, wherein there is no response due to a failure or the like.

This printer controller 2-x is connected with a serial I/F 117 and a video I/F 118 in the printer 1-x shown in FIG. 2 via a serial I/F 206 and video I/F 207. Furthermore, the printer controller 2-x includes an operation panel 209 for setting various operations.

In the configuration, the control modules 11-14 of the printer 1-x execute communication via the serial I/F. Usually, these modules execute sending and receiving of control commands and control parameters between the respective CPU of the modules via the serial I/F.

Meanwhile, the NIC 208 of the printer controller 2-x, the image expansion unit 210, video I/F 207, video I/F 118 of the control module 11, image quality correction control GA 146 of the control module 14 and image output unit 147 (input of print image data the client system 3-y), and the image input unit 138 of the control module 13, image processing ASIC 137, image quality correction control GA 146 and image output unit 147 (input of script image data from the image reader) are connected with each other with a relatively high-speed data bus to transfer image data.

Figure 4:
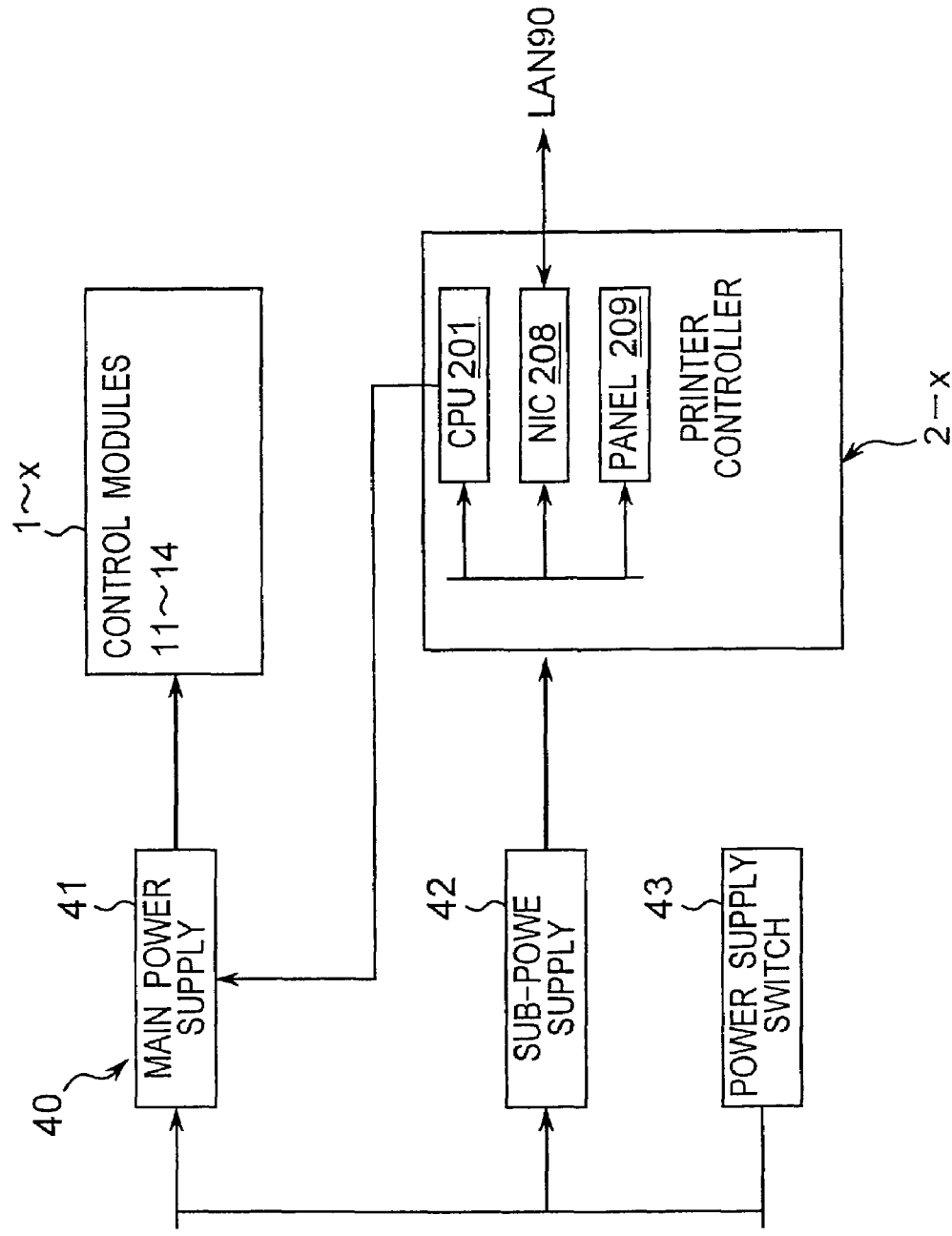
FIG. 4 shows a configuration of a power supply circuit, which executes power supply control for the printer controller 2-x and control modules 11-14 of the printer 1-x.

FIG. 4 shows a configuration of a power supply circuit 40, which executes power supply control of the printer controller 2-x and the control modules 11-14 of the printer 1-x. This power supply circuit 40 includes a large-capacity main power supply 41 for supplying power to the printer 1-x, small-capacity sub-power supply 42 for supplying power to the printer controller 2-x and power supply switch 43 for turning on or interrupting these main power supply 41 and sub-power supply 42.

When an execution request of a print job is received from the LAN 90 via the NIC 208 or a start-up request is inputted via the panel 209, the CPU 201 operates as PMP (Power Management Processor) and outputs a power-on command signal to the main power supply 41. With this power-on command signal, the main power supply 41 is turned on, and power is supplied to the control modules 11-14 in the printer 1-x and various driving loads. Furthermore, when a print job is not received or a start-up request from the panel 209 is not inputted for a predetermined time after the print job is executed, the CPU 201 outputs a power supply interrupt command signal to the main power supply 41. With this power supply interrupt command signal, the main power supply 41 is interrupted, and the power supply to the control modules 11-14 in the printer 1-x and various driving loads is interrupted. On the other hand, so long as the power supply switch 43 is on, power is always supplied from the sub-power supply to the printer controller 2-x.

Figure 6:
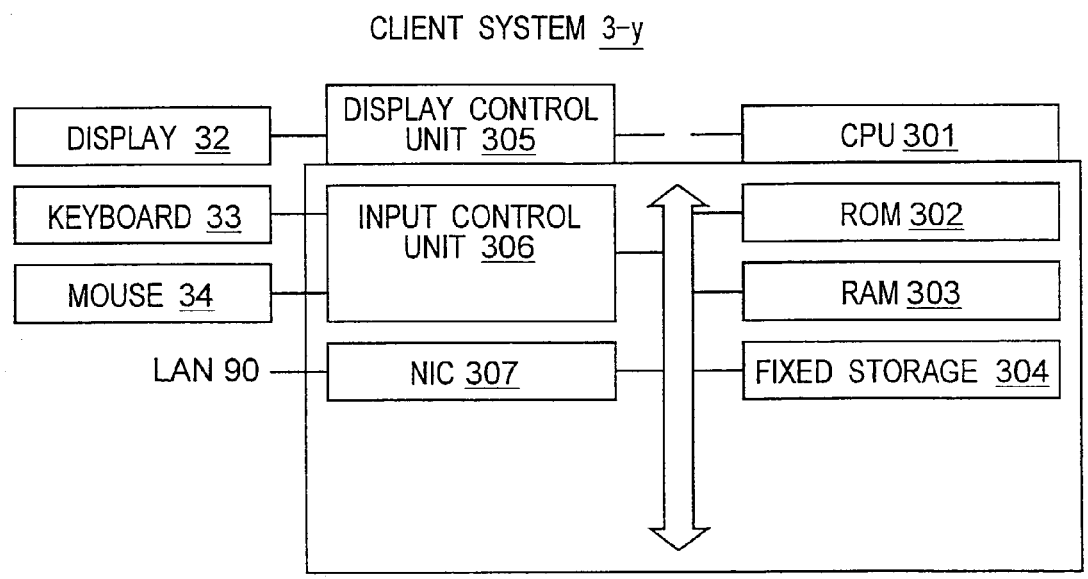
FIG. 6 is a block diagram showing a client system 3-y connected to the LAN.

FIG. 6 is a block diagram showing the client system 3-y. The client system 3-y includes a CPU 301, ROM 302, RAM 303, fixed storage (nonvolatile memory) 304 such as a hard disc and the like, display control unit 305, input control unit 306 and NIC 307 mounted on its main body. Furthermore, a display 32 is connected to this main body via a display control unit 305 as well as a keyboard 33 and a mouse 34 via an input control unit 306. This client system 3-y is connected to the LAN 90 via the NIC 307.

The ROM 302 stores a document editing application program, image editing application program and printer driver for the CPU 301 to execute. The printer driver creates a print job data consisting of job control information, page control information and print image data described in PDL (Page Description Language). The job control information includes a job identifier, job name, job sender name, job destination (IP address of the image forming device), relay destination of the job (IP address of the print server), number of copies of the job, job processing mode (for setting a job mode such as priority job, non-priority job, job synthesis, job fragmentation or the like) and so forth, and these are defined per a job for the printer 1-x. The page control information is control information such as a document identifier, document name, double-face printing, paper size, paper feeding port to be selected, paper ejection mode and so forth, which is used when print data is printed on paper. The print image data described in PDL (Page Description Language) is acquired by converting application data stored by an application program to data that can be interpreted by the printer controller 2-x. During an operation of the printer driver, a predetermined operation screen is displayed on a display 32, inputs from various keys and the mouse by the operator of the client system 3-y are received, and job control information and page control information are created in response to these inputs. Then, when a print request is inputted on the operation screen, application data is converted to print image data described in PDL (Page Description Language), issuing a print job request and sending of the print job data to the printer 1-x specified in the job control information are executed. In the printer 1-x, print control according to the received job control information and page control information is executed to print the print data. Furthermore, as described later, the client system 3-y receives a print completion time of the requested print job from the print server 91 and displays it on the display 32.

Figure 5:
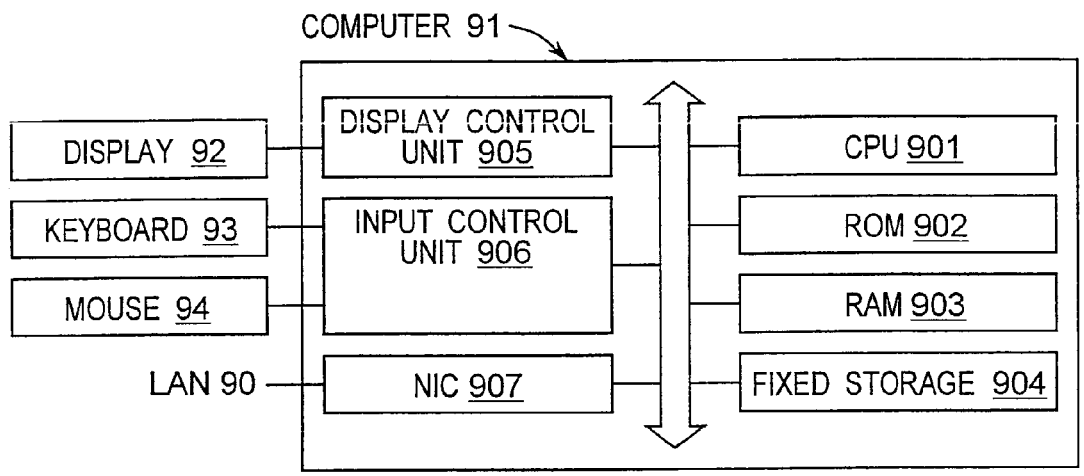
FIG. 5 is a block diagram showing a printer server 91 connected to the LAN.

FIG. 5 is a block diagram showing the printer server 91.

The printer server 91 is a computer having the same hardware as the client system 3-y has, and includes a CPU 901, ROM 902, RAM 903, fixed storage (nonvolatile memory) 904 such as a hard disc or the like, display control unit 905, input control unit 906 and NIC 907 mounted on its main body. A display 92 is connected to this main body via a display control unit 905 as well as a keyboard 93 and a mouse 94 via an input control unit 906. This printer server 91 is connected to the LAN 90 via the NIC 907.

The ROM 902 stores a control program described below for the CPU 901 to execute. This control program, which is described later in detail, executes processing for selecting a printer with the earliest print completion time among a plurality of printers 1-x connected to the LAN 90 as a destination when an operator tries to send a print job to the client system 3-y.

The RAM 903 stores a status of each printer 1-x received from each printer controller 2-x via the LAN 90. Upon transition of the status of a printer 1-x from the standby mode to the sleep mode, an elapsed time from the time when the printer 1-x made a transition to the sleep mode is counted by the CPU 901. Then, the elapsed time is stored in the RAM 903 in real time.

The fixed storage 904 such as a hard disc or the like stores a table showing correspondence between the elapsed time from the time when each printer 1-x made a transition to the sleep mode and fixing roller temperature depending on the elapsed time (exemplified in FIG. 9) and a table showing the fixing roller temperature in the sleep mode and a recovery time (warm-up completion time) required to reach the standby mode from the time of start-up from a state with the fixing roller temperature (exemplified in FIG. 10).

Figure 8:
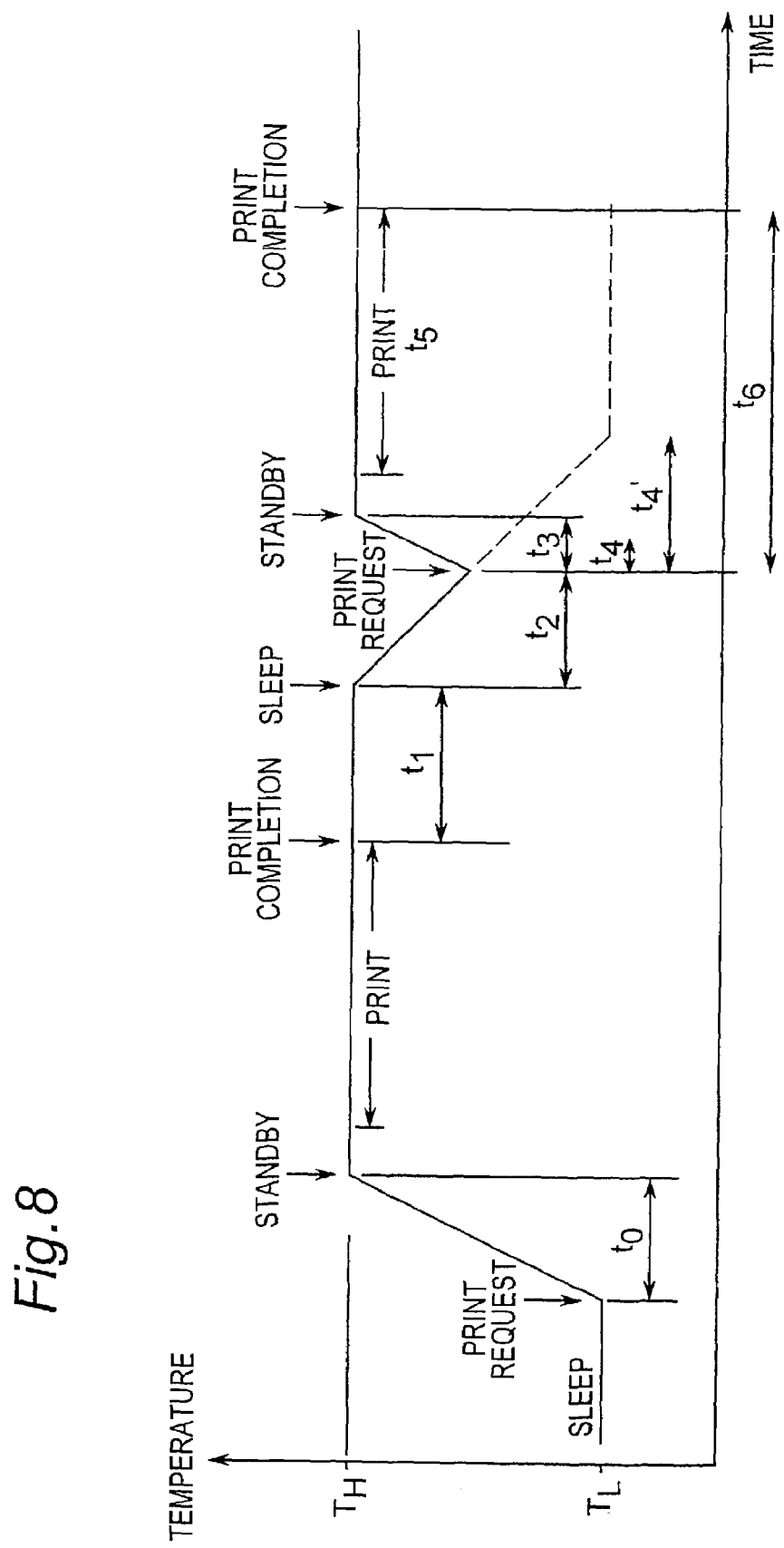
FIG. 8 shows changes with time of fixing roller temperature of the printer 1-x.

In the sleep mode, since the power supply to the fixing roller is interrupted, when a long time elapses since the time when the printer 1-x made a transition to the sleep mode, the fixing roller temperature is room temperature $T_L$ as shown in a left end portion of FIG. 8. When a print request is received at this time, power is supplied to the fixing roller, and the fixing roller temperature rises from room temperature $T_L$ to temperature $T_H$ requested in the standby mode. Therefore, since a print request is received, a recovery time $t_0$ depending on the temperature difference $(T_H-T_L)$ elapses, and then printing is started. When a print job is not received during a predetermined time $t_1$ after completion of the printing, the printer makes a transition from the standby mode to the sleep mode again.

Meanwhile, when a printer 1-x that made a transition to the sleep mode and is maintained for a long time such as, for example, a printer 1-x of which fixing roller temperature is lowered to room temperature $T_L$ is selected to execute a print job, a print completion time becomes longer since the recovery time $t_0$ becomes long. Therefore, in this embodiment, when the operator sends a print job from the client system 3-y, the printer server 91 selects a printer 1-x to be a destination as follows.

Figure 7:
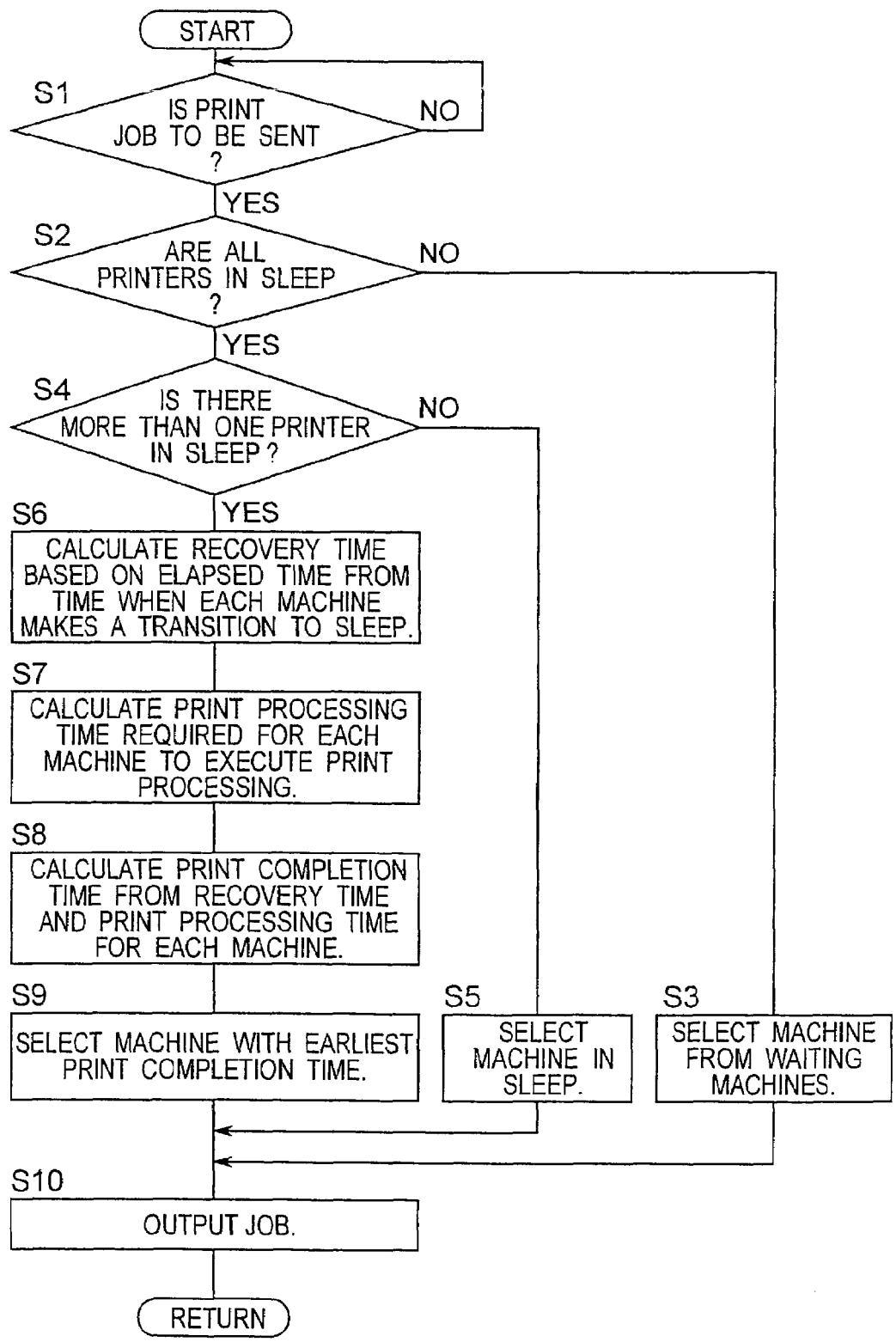
FIG. 7 shows a flow chart of control executed by a CPU of the printer server 91.

(1) As shown in FIG. 7, when the operator operates the client system 3-y to make a print job send request (YES in S1), first whether all printers 1-x connected to the LAN 90 are in the sleep mode is judged (S2). Here, when there is any printer (machine) in the standby mode among a plurality of printers 1-x connected to the LAN 90, the printer in the standby mode is selected as the destination of the print job (S3). When there are a plurality of printers in the standby mode, a printer is selected from them.

(2) When all the printers 1-x connected to the LAN 90 are in the sleep mode (YES in S2), whether a plurality of printers are in the sleep mode is judged (S4). When one printer is in the sleep mode (YES in S4), the printer is selected as the destination of the print job (S5).

(3) On the other hand, when there are a plurality of printers 1-x in the sleep mode (NO in S4), an elapsed time for each of these printers from the time when they made a transition to the sleep mode, which is stored in the RAM 903 of the printer server 92, is acquired. Temperature of a fixing roller is obtained from the elapsed time based on the table in FIG. 9, and the recovery time to the standby mode is calculated from the temperature of the fixing roller based on FIG. 10 (S6). For example, as shown in the central portion in FIG. 8, when the elapsed time from the time when the printer made a transition from the standby mode to the sleep mode is t2, the recovery time t3 is calculated from the relationship of the elapsed time, fixing roller temperature and recovery time.

(4) Meanwhile, for each of these printers in the sleep mode, a print processing time required for image data processing and printing on paper for the print job is calculated or acquired (S7 in FIG. 7). Here, for example, as shown in the central portion of FIG. 8, the print processing time is obtained by dividing into a pretreatment time $t_4$, when image data processing is executed before printing on paper is started and a real print time $t_5$, when printing is actually being executed after printing on paper is started.

(5) Subsequently, based on the recovery time and the print processing time, a print completion time of the print job is calculated (S8 in FIG. 7). When the recovery time $t_3$ is longer than the pretreatment time $t_4$ as shown in the central portion of FIG. 8, the print completion time $t_6$ is calculated based on the sum of the recovery time $t_3$ and real print time $t_5$. On the other hand, when the pretreatment time is longer than the recovery time $t_3$ as shown as $t_4'$, the print completion time is calculated based on the sum of the pretreatment time $t_4'$ and the real print time $t_5$.

(6) Then, a printer with the earliest (shortest) calculated print completion time $t_6$ among these printers 1-x in the sleep mode is selected as the destination of the print job (S9 in FIG. 7). Then, control for sending the print job to the printer is executed (S10) to allow the printer to execute print processing.

Thus, in this embodiment, whether a printer 1-x is in the sleep mode is judged, a recovery time to the standby mode is calculated based on an elapsed time from the time when the printer made a transition from the standby mode to the sleep mode, and a printer with the earliest print completion time is selected based on this time. Therefore, even if there are waiting printers in the sleep mode in the LAN 90, a printer with the earliest print completion time can be correctly selected as the destination of the print job.

In the above embodiment, a print completion time is calculated from the recovery time from the sleep mode to the standby mode and the print processing time, and a printer with the earliest calculated print completion time is selected. But, a printer with the earliest recovery time may be selected based on only the recovery time from the sleep mode to the standby mode. Or, a printer with the shortest elapsed time may be selected based on only the elapsed time from the start of the sleep mode. Or, a printer with the highest fixing roller temperature may be selected based on only the calculated fixing roller temperature.

In the above embodiment, the recovery time from the time of the start of the sleep mode to the standby mode is calculated by using both the relationship between time from the start of the sleep mode and fixing roller temperature shown in FIG. 9, the relationship between the fixing roller temperature and the recovery time to the standby mode shown in FIG. 10. But, a table of the time from the start of sleep and the recovery time to the standby mode may be provided from the beginning.

In the above embodiment, the elapsed time from the start of the sleep mode is stored every moment. But, only data of the time when the printer made a transition from the standby mode to the sleep mode may be stored and, when it is required to calculate a recovery time from the sleep mode, an elapsed time may be calculated based on this time data.

In the above embodiment, only when all the printers are in the sleep mode, a recovery time from the sleep mode to the standby mode or the like is calculated, but may be calculated when those in the busy mode and those in the sleep mode are both present. That is, the print completion time of those in the busy mode and the print completion time of those in the sleep mode are compared, and a printer with the earliest print completion time is selected.

Furthermore, processing during a transition from the standby mode to the sleep mode has been explained, but, even when a printer makes a transition from the standby mode to the preheat mode instead of the sleep mode, the print completion time is similarly calculated.

When a printer makes a transition from the standby mode to the sleep mode, the printer may make a transition to the sleep mode via the preheat mode. In this case, power can be saved in stages by supplying a small amount of power to the fixing roller during the preheat mode and interrupting the power supply during the sleep mode. The print completion time can also be calculated from the time of start of each mode.

It is desirable to notify the acquired print completion time $t_6$ to a client system 3-y that has sent the print job. In this case, a client who operates the client system 3-y can be informed of a correct print completion time, and user convenience is improved. It is noted that the print completion time includes a "duration" required until completion of printing or a "completion time", which is shown as about the time when printing is completed, or both of these.

In this embodiment, when the operator tries to send a print job from the client system 3-y, the printer server 91 executes processing wherein a printer with the earliest print completion time is selected as the destination among a plurality of printers 1-x connected to the LAN 90, but the processing is not limited to this example. For example, a client computer, a server in which a utility program is installed and a printer may share the aforementioned steps. For example, a recovery time calculated in the printer may be sent to the server, a print processing time calculated in the client computer may be sent to the server, and a print completion time may be calculated in the server based on these recovery time and print processing time.

Furthermore, in this embodiment, the printer controller 2-x and the printer 1-x are explained as separate devices, but, naturally, an integrated configuration wherein a function of the printer controller 2-x is built in the printer 1-x may be used. In this case, as in the case of the aforementioned examples, the printer controller 2-x and the control modules 11-14 execute processing while communicating with each other.

As shown above, according to the present invention, a printer can be appropriately selected even when printers are waiting in the power save mode.

Furthermore, according to another aspect of the invention, printing can be started or completed in the shortest time even when printers are waiting in the power save mode.

Furthermore, according to another aspect of the invention, whether the printer is in the power save mode is judged, a recovery time required for the printer to recover to the standby mode is calculated, and a printer with the earliest print completion time is selected based on this time. Therefore, even when printers that are waiting in the power save mode exist in the network system, a printer with the earliest print completion time can be correctly selected as the destination of the print job.

Furthermore, according to another aspect of the invention, whether a printer is in the power save mode is judged, a recovery time required for the printer to recover to the standby mode is calculated, and the print completion time is calculated or acquired based on this time. Therefore, a correct print completion time can be notified to the client.

What is claimed is:

1. A printer management method in a computer system, which controls a plurality of printers connected to a network, comprising the steps of:
   acquiring first information related to an elapsed time from the time when each printer made a transition to the power save mode;
   obtaining second information by at least one of a) calculation and b) referring to at least one table, based on the acquired first information, related to a recovery time from the current power save mode to a standby mode for each printer; and
   selecting a printer based on the obtained information related to the recovery time.

2. The printer management method according to claim 1, wherein the information related to the elapsed time is information about temperature of a fixing roller in the printer.

3. The printer management method according to claim 1, wherein a step of acquiring information about a time required for printing processing is further included, and, in the step of selecting a printer, the information about the time required for printing processing is also added to select a printer.

4. The printer management method according to claim 1, wherein this method is executed when all the controlled printers are in the power save mode when a print job occurs.

5. The printer management method according to claim 1, wherein, in the step of selecting a printer, a printer that is expected to complete printing earliest among the plurality of printers is selected based on the information about the elapsed time.

6. The printer management method according to claim 1, wherein this method is executed by a printer server.

7. The printer management method according to claim 1, wherein the power save mode is a sleep mode.

8. A printer management system, which controls a plurality of printers connected to a network, comprising:
   a means for acquiring first information related to an elapsed time from the time when each printer made a transition to a power save mode;
   a means for obtaining second information by at least one of a) calculation and b) referring to at least one table, based on the acquired first information, related to a recovery time from the current power save mode to a standby mode for each printer; and
   a means for selecting a printer based on the obtained information related to the recovery time.

9. The printer management system according to claim 8, wherein the information related to the elapsed time is information about temperature of a fixing roller in the printer.

10. The printer management system according to claim 8, wherein a means for acquiring information about a time required for printing processing is further included, and, the means for selecting a printer selects a printer also based on the information about the time required for printing processing.

11. The printer management system according to claim 8, wherein the each means operates when all the controlled printers are in the power save mode when a print job occurs.

12. The printer management system according to claim 8, wherein, the means for selecting a printer selects a printer that is expected to complete printing earliest among the plurality of printers based on the information about the elapsed time.

13. The printer management system according to claim 8, wherein the each means is included in a printer server.

14. The printer management system according to claim 8, wherein the power save mode is a sleep mode.

15. A printer management method in a computer system, which controls a plurality of printers connected to a network, comprising the steps of:
   storing predetermined information at the time when each printer made a transition to a power save mode, said predetermined information being used to obtain a recovery time from the current power save mode to a standby mode by at least one of a) calculation and b) referring to at least one table;
   updating the stored information periodically after the time when said each printer made a transition to the power save mode; and
   selecting a printer based on the stored information.

16. The printer management method according to claim 15, wherein the predetermined information is an information about an elapsed time from the time when said each printer made a transition to the power save mode.

* * * * *